United States Patent

[11] 3,621,396

[72] Inventor Thomas Henry Daugherty
Oakhurst, N.J.

[21] Appl. No. 35,761
[22] Filed May 8, 1970
[45] Patented Nov. 16, 1971

[73] Assignee Bell Telephone Laboratories, Inc.
Murray Hill, Berkeley Heights, N.J.

[54] DELTA MODULATION INFORMATION TRANSMISSION SYSTEM
6 Claims, 1 Drawing Fig.

[52] U.S. Cl. .......... 325/38 B
[51] Int. Cl. .......... Ho4b 1/00
[50] Field of Search .......... 325/38 R, 38 A, 38 B, 41, 42, 43, 44; 179/15 AC, 15 AE, 15 AP, 15 AZ

[56] References Cited

UNITED STATES PATENTS

| | | | |
|---|---|---|---|
| 3,497,624 | 2/1970 | Brolin .......... | 325/38 B |
| 3,568,061 | 3/1971 | Brolin .......... | 325/38 B |

*Primary Examiner*—Robert L. Griffin
*Assistant Examiner*—Albert J. Mayer
*Attorneys*—R. J. Guenther and Kenneth B. Hamlin

ABSTRACT: A delta-modulation system is disclosed in which an analog value, which each digit in a delta-modulated output signal represents, is varied in response to predetermined patterns of the delta-modulated output signal. The system is configured to allow the step size to alternate easily between two adjacent step sizes but imposes stricter requirements before further step-size changes are made. The easy alternation between adjacent step sizes improves system fidelity while the stricter requirements for further step-size changes have a filtering effect by preventing large changes in step size due to short bursts of noise or unwanted signal.

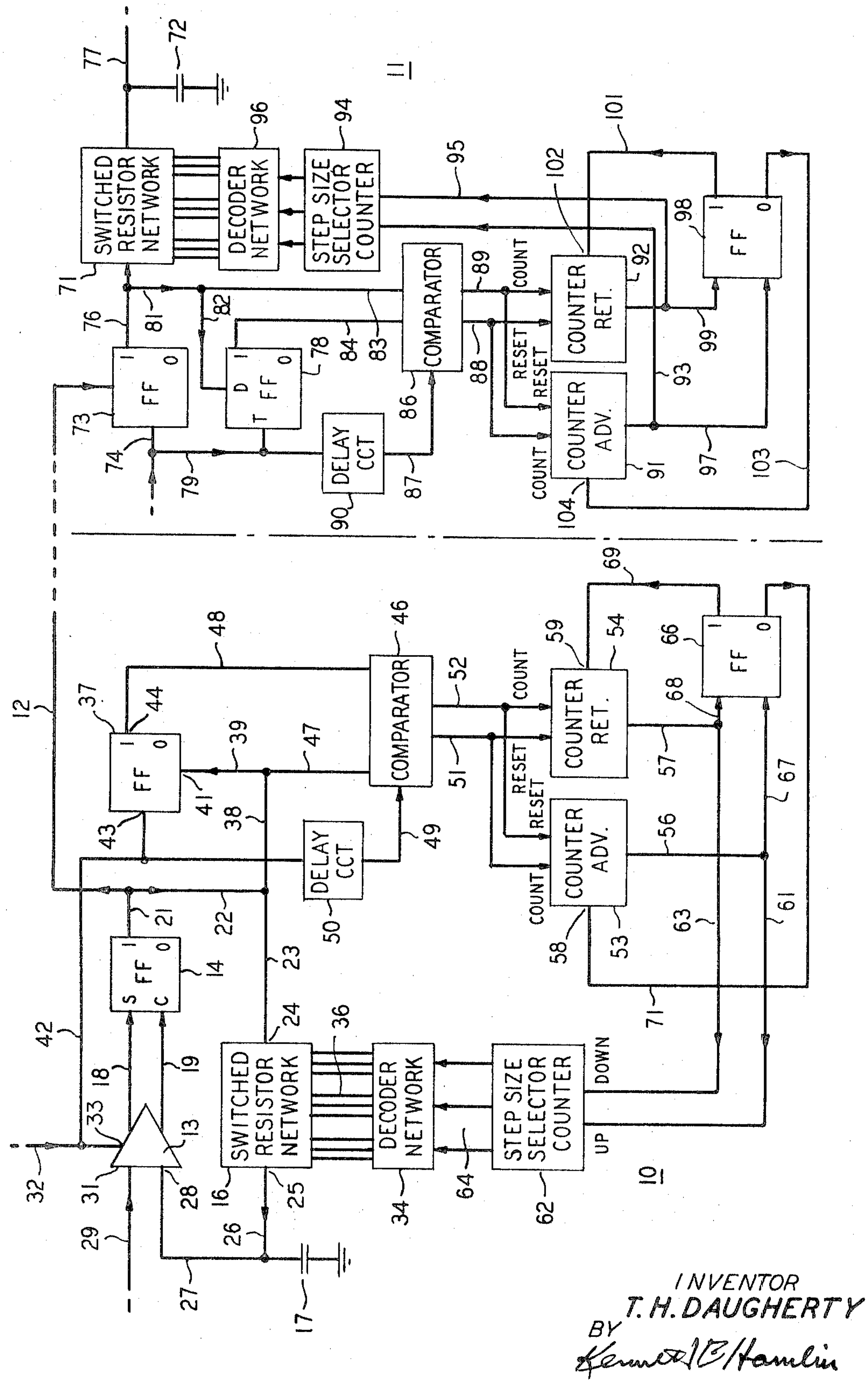
INVENTOR
T. H. DAUGHERTY
BY Kenneth B. Hamlin
ATTORNEY

DELTA MODULATION INFORMATION TRANSMISSION SYSTEM

FIELD OF THE INVENTION

This invention relates to a delta-modulation information-transmission system and in particular to a delta-modulation information-transmission system in which an analog quantity represented by each of a series of digital bits is varied in response to predetermined patterns of the digital bits in the series.

BACKGROUND OF THE INVENTION

In a system employing the most common form of delta modulation, a message waveform is sampled at a predetermined sampling rate to selectively provide positive and negative step signals to integrating circuits at both a transmitter and a receiver. In a delta modulator at the transmitter, the output of the integrator is compared with the instantaneous amplitude of the message waveform at the sampling instant to determine the polarity of the next step signal. A binary digit corresponding to the polarity of the step signal is transmitted to the receiver once each sampling instant. In the delta demodulator at the receiver, the incoming digits control the polarity of a locally generated step signal applied to the receiver's integrator thereby reproducing a close approximation of the original message waveform.

Important factors tending to detract from transmission quality in such a delta modulation system include quantizing noise and overload distortion. Quantizing noise is caused by step signals which are not and cannot be infinitesimally small. This can be particularly bothersome under idle circuit conditions or when the average slope of the transmitted message waveform is small. Overload distortion occurs when the slope of the step signal is not large enough to permit the integrator output to follow changes in the instantaneous amplitude of the message waveform.

When the step size in a delta-modulation system is held constant while the amplitude of a constant frequency message signal is increased, the signal-to-noise ratio increases at first and then sharply decreases. The initial increase in signal-to-noise ratio results because the percent effect of quantizing noise decreases as the amplitude of the message signal increases. A point is reached, however, where an increase in signal amplitude will result in overload distortion so that at that point the signal-to-noise ratio will decrease rather abruptly.

For each value of step size, a similarly shaped signal-to-noise versus signal-amplitude curve will be traced. For higher step sizes, the curve will be displaced toward higher signal amplitudes.

It is apparent that the effect of quantizing noise can be minimized by reducing the size of the step signal but the problem of overload distortion would then be increased. Similarly, the effect of overload distortion can be minimized by increasing the size of the step signal, but this change would increase quantizing noise.

One system that minimized both quantizing noise and overload distortion included circuitry for companding the message waveform signal at the transmitter and expanding the reproduced message at the receiver. This system improved the quality of delta-modulated transmission systems but involved complex analog circuits. Other systems employed in order to minimize the combined effects of quantizing noise and overload distortion either continuously or discretely varied the step size within the delta modulator.

All of the above systems derived information for changing the amplitude of the message waveform or the step size from the analog message waveform. Various algorithms have been employed for deciding when a step size or amplitude change was indicated. The most straightforward one involved measuring the average slope of the message waveform and setting the step size amplitude in accordance therewith. In one system described above, hysteresis was added to inhibit step size or amplitude from switching continuously between adjacent settings. These systems, while improving the signal-to-noise ratio in delta-modulation systems, do not maximize the signal-to-noise ratio. Since the transmission rate of a delta-modulation system is determined by the signal-to-noise performance of the system, it is desirable to provide a system in which signal-to-noise is a maximum.

Another system has been suggested in which the presence or absence of two consecutive similar bits in the transmitted binary digits is used to increase or decrease step size. This system in practice has been found to be unstable; i.e., it continuously and uncontrollably shifts between all available step sizes.

BRIEF DESCRIPTION OF THE INVENTION

It has been found that variation of step size in delta-modulation systems serves two distinct functions. The first function is to adjacent the system to a proper operating point in step size. This function is made restrictive so as to prevent the system from making large changes in step sizes due to bursts of noise and unwanted signal. The second function is to allow the system to vary between two adjacent step sizes to accurately follow the message waveform. This step-size variation must take place at a rate consistent with the changing slope of the message waveform.

In accordance with this invention, a delta-modulation system is provided in which an analog quantity represented by each of a series of digital information bits is increased or decreased in response to predetermined sequences of the digital information bits in the series The length of the pattern required for either increasing or decreasing the analog quantity is selectively adjusted based upon the direction of the immediately preceding change. In this way, the analog quantity is allowed to vary more easily between adjacent step sizes than to continue changing in the same direction.

DESCRIPTION OF THE DRAWING

The single FIGURE of the drawing is a block diagram showing a transmitter and a receiver which together form a delta-modulation information-transmission system in accordance with the teachings of this invention.

DETAILED DESCRIPTION

The drawing shows a delta-modulation information-transmission system including a transmitter 10 and a receiver 11 connected together by a transmission facility 12. The transmitter 10 includes a differential amplifier 13, a flip-flop 14, a switched resistor network 16, and a capacitor 17. One output of the differential amplifier 13 applied to a lead 18 drives a set input of flip-flop 14 while a second output applied to lead 19 drives a clear or reset input of the flip-flop 14. An output from the flip-flop 14 is applied by leads 21, 22, and 23 to an input terminal 24 of the switched resistor network 16. A lead 26 connects an output terminal 25 of the switched resistor network 16 to the capacitor 17. The junction of the capacitor 17 and the lead 26 are connected by a lead 27 back to a first input terminal 28 of the differential amplifier 13.

A signal is applied, by a source not shown, through an input lead 29 to a second input terminal 31 of the differential amplifier 31. A sampling pulse provided periodically, by a clock not shown, is applied by a lead 32 to a gating input terminal 33 of the differential amplifier 13.

Each time a sampling pulse is applied to the gating input terminal 33, the differential amplifier 13 provides a first set of signals on the leads 18 and 19 if the signal on the terminal 31 exceeds the signal on the terminal 28. On the other hand, the differential amplifier 13 provides a second set of signals on the leads 18 and 19 when the signal on the terminal 31 is less than the signal on the terminal 28.

The first set of signals applied to the leads 18 and 19 sets the flip-flop 14 to a first state while the second set of signals on the leads 18 and 19 resets the flip-flop 14 to a second state. The signal on the output of flip-flop 14 drives the switched resistor network 16 which exhibits a resistance between the terminals 24 and 25 in accordance with signals applied from a decoder network 34 on a plurality of leads 36. Since the voltages provided on the output lead 21 of the flip-flop 14 are large compared with the maximum voltage generated across the capacitor 17 the change in voltage across the capacitor 17 in one interval between sampling pulses is nearly a linear function of the resistance exhibited by the switched resistor network 16. This voltage change is referred to in the art as step size. The output from the flip-flop 14 is the delta-modulated signal of which is transmitted over the transmission medium 12 to the receiver 11 where it is reconstructed.

If the step size determined by the switched resistor network 16 is small compared with the change in voltage of the message waveform between sampling pulses, the same output will be obtained from the flip-flop 14 over consecutive sampling intervals. If on the other hand, the signal on the lead 29 is relatively constant or small in amplitude compared with the step size determined by the switched resistor network 16 each sampling interval the voltage across the capacitor 17 will increase or decrease a sufficient amount to cause the output from the flip-flop 14 to alternate.

In accordance with this invention, the step size is increased whenever a predetermined number of consecutive similar bits are provided by the flip-flop 14. The step size is decreased whenever each of predetermined number of consecutive bits are different from the one before it. In addition, the step size will also be increased or decreased in response to similar patterns in a smaller number than the predetermined number of consecutive bits as a function of the direction of the last step size change.

The step size changes are accomplished by providing a second flip-flop 37 which stores the information provided by the flip-flop 14 for one sampling interval. The information stored in flip-flop 37 is therefore the information of flip-flop 14 delayed one sampling interval. The output of the flip-flop 14 on the lead 22 is applied by leads 38 and 39 to an input terminal 41 of the flip-flop 37. The sampling pulse on lead 32 is applied by a lead 42 to a transfer input terminal 43 of the flip-flop 37. Each time a sampling pulse is applied to the input terminal 43, the output of the flip-flop 37 appearing on terminal 44 changes to the state which the flip-flop 14 is in. It should be clear that the flip-flops 14 and 37 have slight delays built into the outputs so that the state of the flip-flop 14 can be transferred to the flip-flop 37 while in fact the input information to the flip-flop 14 is being changed.

A comparator 46 compares the output signals from the flip-flops 14 and 37 at a time determined by the sampling pulse on lead 32 to indicate if they are the same or different. The output from the flip-flop 14 is applied to the comparator 46 by leads 21, 22, 38, and 47, while the output from the flip-flop 37 is applied by lead 48 to the comparator 46. The sampling pulse on lead 32 is applied by leads 42, 49 and a delay circuit 50 to the comparator 46.

If the outputs of the flip-flops 14 and 37 are the same when the sampling pulse is applied to the comparator 46, a pulse is provided on a lead 51. If these outputs are different, a pulse is applied on the lead 52. The pulse on the lead 51 will advance a counter 53 one count and reset a counter 54 to its initial state. The pulse on the lead 52 will advance the counter 54 one count while resetting the counter 53 to its initial state.

The counter 53 normally provides an output pulse on a lead 56 after six counts. The counter 54 normally provides an output pulse on a lead 57 after six counts. When a signal is applied to a terminal 58 of the counter 53, a pulse will be provided to the lead 56 after two counts of the counter 53. In a like manner, when a signal is applied to a terminal 59 of the counter 54, a pulse will be applied to the lead 57 after three counts of the counter 54.

The lead 56 is connected by a lead 61 to a step-size selector counter 62 which is an up-down counter. A pulse applied by the counter 53 to leads 56 and 61 will cause the step-size selector counter to increase one count. The lead 57 is connected by a lead 63 to a second input of the step-size selector counter 62 which causes a down count. Therefore, when the counter 53 overflows, the number stored in the step-size selector counter 62 increases and when the counter 54 overflows, the number in the step-size selector counter 62 decreases.

The number stored in the step-size selector counter 62 is applied by a plurality of leads 64 to the decoder network 34 which in turn drives the switched resistor network 16. Therefore, it is seen that the size of the step as determined by the switched resistor network 16 is varied each time one or the other of the counters 53 or 54 overflows. In one mode of operation, the counter 53 will overflow if there are seven consecutive similar bits at the output of flip-flop 14 while the counter 54 will overflow if there are seven consecutive alternating bits provided by the flip-flop 14.

The counters 53 and 54 also drive a set-reset flip-flop 66. Each time the counter 53 provides a pulse on the lead 56, it is also applied by a lead 67 to set the flip-flop 66 to a first state. When the counter 54 overflows, the pulse provided on the lead 57 is also applied by a lead 68 to set the flip-flop 66 to its second state. One output from the flip-flop 66 is applied by a lead 69 to the terminal 59 of counter 54 while the other output from the flip-flop 66 is applied by a lead 71 to the terminal 58 of counter 53. In this way one of the counters 53 and 54 is always conditioned to respond by providing a pulse after its shorter count rather than its longer count. The polarity of signals from the flip-flop 66 is chosen so that the counter 53 or 54 which overflowed last will be in the higher counting condition. In this way, it is seen that it will always be easier for the step size to be returned to the size from which it has just changed.

It can be seen that if the step size has just been increased by the overflow of counter 53, a lesser count will now be available to overflow counter 54. Therefore, three counts will be sufficient to decrease the step size while an additional seven will be necessary to increase it again. This feature enables the delta-modulation system of this invention to easily alternate between two adjacent levels to provide sufficient signal fidelity while inhibiting larger step-size changes without greater indications of distortion.

The delta-modulated signal provided by the flip-flop 14 and transmitted over the transmission medium 12 to the receiver 11 is converted back to an analog signal by a switched resistor network 71 and a capacitor 72. The switched resistor network 71 is identical to the switched resistor 16 in the transmitter. The incoming signal on the transmission medium 12 is applied to a flip-flop 73. A sampling pulse derived from the incoming signal by equipment not shown is applied by a lead 74 to set the flip-flop to a state determined by the received signal. An output from the flip-flop 73 is applied by a lead 76 to the switched resistor network 71. The switched resistor network 71 and the capacitor 72 act together to integrate the signal on the lead 76 to reconstitute the received signal and provide an analog output on an output terminal 77.

In a delta-modulation system where there is no step size variation, the flip-flop 73, a single resistor and the capacitor 72 would be sufficient to reconstitute the received signal. Since, however, the step size is varied at the transmitter, it is necessary to vary the resistance of the switched resistor network 71 to provide the proper analog signal on the terminal 77. To this end, equipment is provided which monitors the received signal and then adjusts the step size of the switched resistor network 71.

A second flip-flop 78 in the receiver 11 is enabled by the sampling pulse to transfer the signal from the output of the flip-flop 73 to the flip-flop 78. The sampling pulse is applied to the flip-flop 78 by a lead 79 while the output of flip-flop 73 is applied to flip-flop 78 by leads 76, 81, and 82. The output signals from the flip-flops 73 and 78 are applied by leads 76, 81, 83, and 84, respectively, to a comparator 86. The comparator 86 corresponds to the comparator 46. The sampling pulse on the lead 79 is applied by a lead 87 and a delay circuit 90 to enable the comparator 86. An output is provided on a lead 88 by the comparator 86 each time the signal on the leads 83 and 84 are the same while an output pulse is provided on a lead 89 each time the output signals on the leads 83 and 84 are different.

The pulse on the lead 88 is employed to advance a counter 91 and reset a counter 92 while the pulse on the lead 89 is employed to reset the counter 91 and advance the counter 92. The counter 91 is identical to the counter 53 while the counter 92 is identical to the counter 54. Each time the counter 91 overflows, a pulse is applied by a lead 93 to advance a step-size selector counter 94. Each time the counter 92 overflows, a pulse is applied by a lead 95 to decrease the count in the step-size counter 94. The output from the step size 94 drives a decoder network 96 which in turn determines the size of the switched resistor 71. Each of the elements in the receiver 11 corresponds to one of the elements in the transmitter 10.

The output from the counter 91 is also applied by a lead 97 to set a flip-flop 98 to a first state. The from the counter 92 is applied by a lead 99 to set the flip-flop 98 to a second state. One output signal from the flip-flop 98 is applied by a lead 101 to an input terminal 102 of the counter 92, while a second output from the flip-flop 98 is applied by a lead 103 to an input terminal 104 of the counter 91. The input terminals 102 and 104 of the counters 92 and 91, respectively, correspond to the input terminals 59 and 58, respectively, of the counters 54 and 53, respectively. In this way it is seen that the equipment at the receiver is configured substantially the same as in the transmitter to reconstitute the step size and the input message waveform from the transmitted signal.

An extension of the criteria for changing the step size can be made for a delta-modulation system that has a finite number of step sizes. If counter 53 overflows while the system is in its maximum step size or counter 54 overflows while the system is in its minimum step size, the state of flip-flop 66 can be changed so as to restrict the movement from these limiting step sizes as if additional step sizes exist. Similar action would be taken at the receiver if this feature is incorporated at the transmitter.

It should be understood that the disclosure is merely illustrative of the principles of this invention. Various other embodiments and modifications will become obvious to those skilled in the art which will not depart from the spirit and scope of the invention.

What is claimed is:

1. In a delta-modulation information-transmission system in which first and second digital signals are included in a serial bit stream to represent an increment of increase or decrease of an analog signal the combination comprising:

first means normally responsive to a sequence of like first or second digital signals of a first length for changing the magnitude of said increment in a first direction and for producing a first control signal, said first means responsive to a second control signal being made responsive to a sequence of like first or second digital signals of a second length; and second means normally responsive to an alternating sequence of first and second digital signals of a first length for changing the magnitude of said increment in a second direction and for producing said second control signal said second means responsive to said first control signal being made responsive to an alternating sequence of first and second digital signals of a second length.

2. The as defined in claim 1 in which said first lengths of consecutive like and alternating digital signals are greater than said second lengths thereof.

3. The combination as defined in claim 1 in which said first lengths of consecutive like and alternating digital signals are equal.

4. The combination as defined in claim 1 in which said second lengths of consecutive like and alternating digital signals are different.

5. In a delta-modulation transmission system in which first and second digital signals are employed in a first serial bit stream having a data interval between bits to represent an increase or decrease of an analog signal by a predetermined amount, the combination comprising:

means responsive to said first serial bit stream for providing a second serial bit stream delayed one data interval therefrom;

means for periodically comparing said first and second bit streams to provide a first count signal when said bit streams are equal and a second count signal when said bit streams are unequal;

a first counter for providing a first output signal at the first output terminal in response to said first counter being advanced a first predetermined number of counts responsive to signals applied at a first terminal for signals applied at a second terminal for resetting said first counter to an initial condition and a first control signal applied to a third terminal for decreasing said first predetermined number;

a second counter for providing a second output signal at a second output terminal in response to said second counter being advanced a second predetermined number of counts, responsive to signals applied at a fourth terminal for advancing said second counter, signals applied at a fifth terminal for resetting said second counter to an initial condition and a second control signal applied to a sixth terminal for decreasing said second predetermined number;

means for applying said first count signal to said first and fifth terminals;

means for applying said second count signal to said second and fourth terminals;

means responsive to first output signal for increasing said predetermined amount;

means responsive to said second output signal for decreasing said predetermined amount; and means responsive alternatively to said first and second output signal for providing said first and second control signals.

6. The combination as defined in claim 5 also comprising:

a transmission medium having first and second ports;

a receiver;

means for applying said first serial bit stream to said first port of said transmission medium and means for connecting said second port of said transmission medium to said receiver.

* * * * *

UNITED STATES PATENT OFFICE
CERTIFICATE OF CORRECTION

Patent No. 3,621,396 Dated November 16, 1971

Inventor(s) Thomas Henry Daugherty

It is certified that error appears in the above-identified patent and that said Letters Patent are hereby corrected as shown below:

Column 2, line 19, "to adjacent the system" should read --to adjust the system--. Column 5, line 19, "The from the counter 92" should read --The output from the counter 92--. Column 6, line 4, "The as defined in claim 1" should read --The combination as defined in claim 1--. Column 6, line 21, "said first and second bit" should read --said first and second serial bit--. Column 6, line 25, "at the first" should read --at a first--. Column 6, line 28, "for signals applied" should read --for advancing said first counter signals applied--. Column 6, line 46, "to first output signal" should read --to said first output signal--.

Signed and sealed this 20th day of June 1972.

(SEAL)
Attest:

EDWARD M.FLETCHER,JR.
Attesting Officer

ROBERT GOTTSCHALK
Commissioner of Patents